April 6, 1943.  E. I. SHOBERT, 2D  2,315,821
GENERATOR REGULATOR
Filed May 12, 1941
Fig. 1.
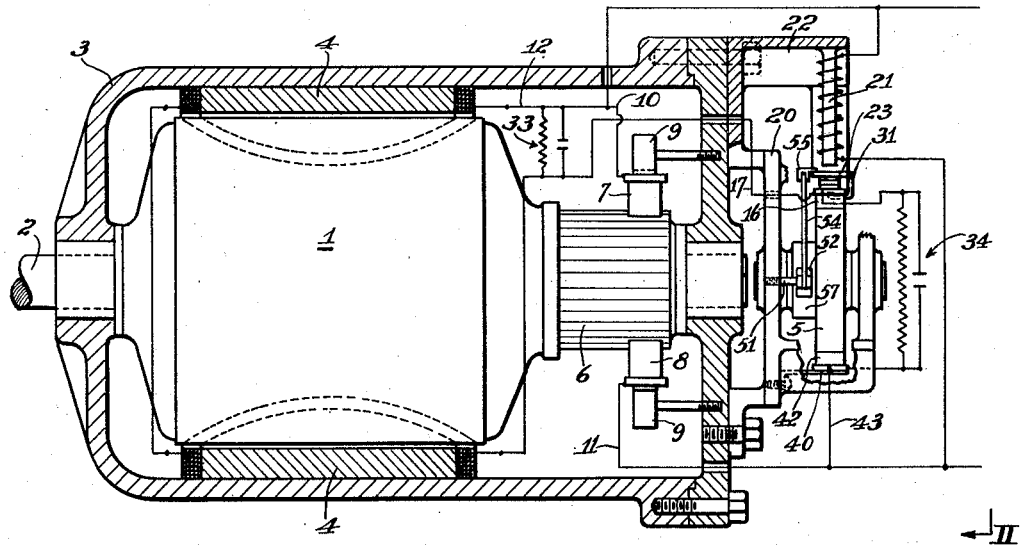
Fig. 2.  Fig. 3.  Fig. 4.
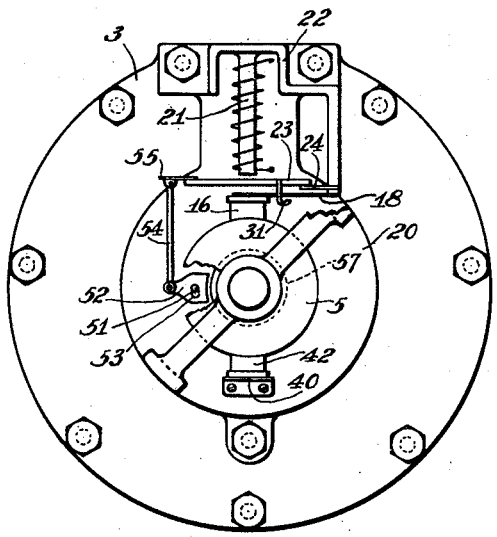 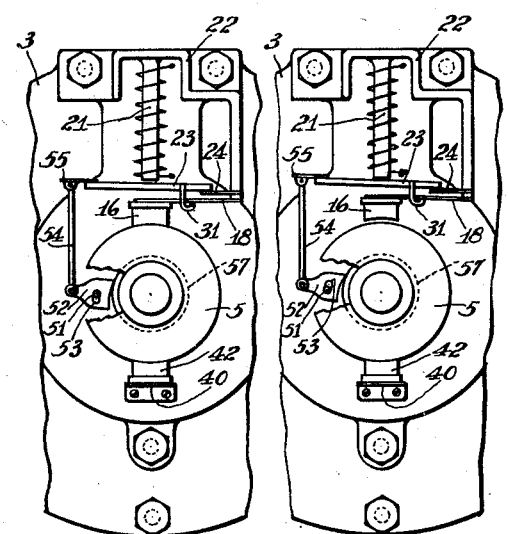
WITNESSES.
A B Wallace.
V. A. Peckham.
INVENTOR.
Erle I. Shobert, II
BY Brown, Critchlow & Flick
his ATTORNEYS.

Patented Apr. 6, 1943

2,315,821

UNITED STATES PATENT OFFICE 2,315,821

GENERATOR REGULATOR

Erle I. Shobert, II, St. Marys, Pa., assignor to Stackpole Carbon Company, St. Marys, Pa., a corporation of Pennsylvania Application May 12, 1941, Serial No. 393,072

2 Claims. (Cl. 171—229)

This invention relates to apparatus for automatically regulating the output of generators, by which is meant either their voltage output or their current output, or both.

The invention disclosed herein is similar to that disclosed in my copending application Serial No. 378,331, filed February 11, 1941, to which reference is made for a statement of the problems encountered in connection with regulating the output of generators. That application discloses a pair of normally engaging, but separable, conductors of electricity that are connected in the field coil circuit of a generator the output of which is to be regulated. One of the conductors is rotatable and slides against the other, which is reciprocable, in order to keep their contact surfaces smooth and clean, thus avoiding change of regulating point and sticking. Means, such as electromagnetic means operably connected to the reciprocable conductor and responsive to the output of the generator, is provided for moving that conductor away from the other one when the generator output reaches a predetermined value, thereby momentarily cutting down the generator output and preventing it from exceeding that value. In some of the embodiments disclosed in my copending application the rotatable conductor takes the form of a slip ring which is driven either by the generator that is being regulated or by a separate electric motor. Sometimes it is not feasible or desirable to drive the slip ring from the generator, while a separate motor for that purpose may also be undesirable, such as in airplanes where the extra weight of the motor is not wanted.

It is among the objects of this invention to provide a generator output regulator of the type discussed above in which the slip ring is rotated by the electromagnetic means by which the reciprocable contact is reciprocated.

In accordance with this invention a reciprocable electrical contact normally is pressed against a rotatable contact, and both contacts are connected in the field coil circuit of a generator so that the circuit is closed when the contacts are in engagement. Electromagnetic means is operably connected to the reciprocable conductor and is responsive to the output of the generator for moving that contact out of engagement with the rotatable contact when the output of the generator reaches a predetermined value, whereby to control the field circuit so as to momentarily cut down the generator output and prevent it from exceeding that value. The electromagnetic means is also operatively connected to the rotatable contact, and in such a manner that the mechanical vibrations of a part of the electromagnetic means are used to rotate that contact.

The preferred embodiment of the invention is illustrated in the accompanying drawing, in which Fig. 1 is a longitudinal section through an electric generator equipped with my voltage regulator and showing the armature and associated parts in elevation while resistance and capacity elements are shown diagrammatically; and Figs. 2, 3 and 4 are end views of the regulator at three different periods in its cycle of operation.

Referring to Fig. 1 of the drawing, a generator armature 1 is mounted on a shaft 2 journaled in the opposite ends of a surrounding metal case 3. One end of the shaft projects from one end of the case and is adapted to be driven by a suitable source of power, such as an automobile engine. The field coils 4 of the generator are attached in the usual manner to the inside of the case at diametrically opposite sides of the armature and are excited from the armature current by being connected in shunt therewith in a manner to be described presently. At one end of the armature is the usual commutator 6 against which a pair of brushes 7 and 8 are pressed by springs 9 supported from the adjacent end wall of the case. The current generated by the rotating armature is carried away from it through these brushes and wires 10 and 11 leading therefrom. One end of the field coil circuit is connected by a wire 12 to wire 10 leading from brush 7, and the other end of the circuit is electrically connected to wire 11 by means of a switch that forms a part of this invention.

The switch is formed from a pair of electrical conductors or contacts that normally are in sliding engagement with each other so that their contact surfaces will remain smooth and clean. As shown in Fig. 1 of the drawing, one of these electrical conductors is a small regulator contact member or brush 16 connected by a wire 17 to the adjacent field coil, and the other conductor is formed by a slip ring 5 journaled in a bracket 20 attached to the end of the generator case. The circuit through the slip ring is completed by a brush 42 pressed against it constantly by a spring 40 projecting from the bracket, the brush being connected by a wire 43 to generator wire 11.

In order to regulate the voltage or current output of the generator the field coil circuit is opened every time the output attempts to exceed a predetermined value, this being done by moving the regulating brush 16 away from the slip ring 5 by means of a solenoid 21. For example, to regulate the voltage the solenoid is shunted across the armature circuit wires 10 and 11 and is operatively connected to the regulating brush so that it can pull that brush away from the ring every time the voltage passing through the solenoid becomes sufficient for that purpose. The solenoid is preferably mounted in a yoke 22 projecting from the top of bracket 20. As shown in Fig. 2, when the solenoid is energized it attracts a metal armature bar 23 that is supported by a leaf spring 24 attached to the bottom of the yoke. Also attached to the yoke below spring 24 is a flat spring 18 that normally presses brush 16 against the slip ring.

Solenoid bar 23 has a lifting member or hook 31 suspended therefrom and projecting under spring 18 from which its lower end is spaced when the bar and hook are in their lower positions as shown in Fig. 2. Thus, the bar 23 can rise a predetermined distance without lifting brush 16 off the slip ring, so when the bar is in its Fig. 2 or Fig. 3 position the brush will ride the slip ring continually in the same manner as brush 42. Hook 31 does not engage spring 18 until the generator output starts to exceed the desired value for which the regulator has been designed, whereby there is no decrease in the spring pressure holding regulating brush 16 against the slip ring until such a time.

As illustrated in Fig. 1, a resistance and capacity 33 are shunted across the field coil in order to absorb inductive voltage generated when the field circuit is opened, and a resistance and capacity 34 are connected to brushes 16 and 42 to help snuff the arc that may be formed when regulating brush 16 is lifted from the slip ring as shown in Fig. 4.

In operation, as soon as the voltage output of the generator starts to exceed the predetermined value for which the regulator has been designed, solenoid bar 23 is drawn toward the solenoid sufficiently to cause hook 31 to pull regulating brush 16 toward the solenoid. As shown in Fig. 4, this action will move the brush' out of engagement with the slip ring and thereby open the field coil circuit of the generator. The resulting immediate drop in voltage of the generator causes the solenoid to allow the regulating brush to again be pressed against the slip ring by spring 18 in order to close the field circuit so that the drop in voltage will be checked and will start to increase again. By repeatedly opening and closing the field coil circuit in this manner by the use of my regulator the voltage output of the generator is maintained substantially constant.

It is a feature of this invention that slip ring 5 is driven by solenoid 21 instead of by the generator or a motor. Accordingly, a pivot pin 51 projects from the main body of bracket 20 toward the slip ring for supporting a lever-like clutch member 52. This clutch has a generally vertical slot 53 through its lower central portion for receiving pin 51, and its outer end is pivotally connected by a vertical link 54 to a bifurcated member 55 projecting laterally and forwardly from the free end of solenoid bar 23. When the regulator is not operating, or when bar 23 is in its lower position, as shown in Fig. 2, the inner end of the clutch is located close to but spaced from a clutch ring 57 connected to the inner face of the slip ring with which it is concentric although it is of considerably smaller diameter. When the outer end of the clutch is raised by bar 23, the upper corner of the inner end of the clutch engages the clutch ring as shown in Fig. 3. At the same time hook 31 is raised nearly high enough to engage brush spring 18. Further lifting of bar 23 as the voltage in the solenoid increases raises the outer end of the clutch still higher, but as the contact between its inner end and the clutch ring prevents the clutch from turning further on pin 51, the clutch is raised bodily with slot 53 sliding up on the pin as shown in Fig. 4. This movement causes the clutch to rotate the clutch ring through a very short arc, and lifts brush 16 out of engagement with the slip ring so that the field coil circuit is opened. The generator voltage immediately starts to drop which causes the solenoid to release bar 23. This bar and regulating brush with their associated elements therefore move back to the positions shown in Fig. 2. The moment link 54 starts to move downwardly the pressure of the inner end of the clutch against the clutch ring is relieved so that the clutch drops down on pin 51 without tending to turn the slip ring in a reverse direction. Due to the rapid reciprocation of link 54 the slip ring is rapidly rotated by the clutch. This desired rotation is thus obtained without driving the slip ring from the generator shaft 2 and without requiring a separate driving motor.

According to the provisions of the patent statutes I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a generator output regulator of the type in which normally engaging rotatable and reciprocable conductors are connected in a generator field circuit and electrically actuated means connected in the generator armature circuit are operatively connected to the reciprocable conductor for moving it away from the rotatable conductor when said output reaches a predetermined value; a clutch ring adapted to be connected to said rotatable conductor coaxially thereof, a lever disposed substantially radially of said ring with its inner end close to the periphery of the ring, said lever having a transverse slot through it, a fulcrum projecting into said slot, and means for pivotally connecting the outer end of the lever to said electrically actuated means for swinging and moving the lever bodily laterally, said lever being so formed that when swung in one direction it frictionally engages and turns said ring.

2. In a generator output regulator of the type in which normally engaging rotatable and reciprocable conductors are connected in a generator field circuit and a solenoid is connected in the generator armature circuit for drawing an armature toward it when said output reaches a predetermined value; means adapted to provide a lost motion connection between the armature and reciprocable conductor for moving the latter away from the rotatable conductor, a clutch ring adapted to be connected to said rotatable conductor coaxially thereof, means mounted adjacent said ring for frictionally engaging and turning the ring when said means is moved in a predetermined direction, and means for operatively connecting said solenoid armature to said ring-engaging means for moving the latter in accordance with the movements of said solenoid armature.

ERLE I. SHOBERT, II.